(12) United States Patent
Huh et al.

(10) Patent No.: US 8,032,411 B2
(45) Date of Patent: Oct. 4, 2011

(54) GROUP ADVERTISEMENT METHOD IN SIP BASED MESSAGE SERVICE

(75) Inventors: Kang-Suk Huh, Gyeonggi-Do (KR); Sung-Mu Son, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 1024 days.

(21) Appl. No.: 11/749,651

(22) Filed: May 16, 2007

(65) Prior Publication Data

US 2007/0282685 A1    Dec. 6, 2007

Related U.S. Application Data

(60) Provisional application No. 60/809,845, filed on Jun. 1, 2006.

(30) Foreign Application Priority Data

| Jul. 10, 2006 | (KR) | .......................... 10-2006-0064641 |
| Jul. 14, 2006 | (KR) | .......................... 10-2006-0066573 |
| May 8, 2007 | (KR) | .......................... 10-2007-0044692 |

(51) Int. Cl.
G06Q 30/00 (2006.01)

(52) U.S. Cl. ..................................................... 705/14.1
(58) Field of Classification Search .................. 705/14.1
See application file for complete search history.

(56) References Cited

U.S. PATENT DOCUMENTS

| 2003/0012149 A1 | 1/2003 | Maggenti et al. | |
| 2003/0083086 A1 | 5/2003 | Toyryla et al. | |
| 2003/0153341 A1 | 8/2003 | Crockett et al. | |
| 2004/0057405 A1 | 3/2004 | Black | |
| 2005/0054361 A1 | 3/2005 | Turcanu et al. | |
| 2005/0233776 A1 | 10/2005 | Allen et al. | |
| 2005/0262542 A1* | 11/2005 | DeWeese et al. | ............. 725/106 |
| 2006/0046759 A1 | 3/2006 | Yoon et al. | |
| 2006/0092895 A1 | 5/2006 | Kim et al. | |
| 2007/0127505 A1* | 6/2007 | Laurila et al. | ................. 370/400 |

FOREIGN PATENT DOCUMENTS

| KR | 10-2006-0036031 A | 4/2006 |
| WO | WO 01/20939 A1 | 3/2001 |
| WO | WO 01/67675 A2 | 9/2001 |

(Continued)

OTHER PUBLICATIONS

Push to Talk over Cellular (PoC)—Architecture, Candidate Version 1.0, Jan. 27, 2006, Open Mobile Alliance, OMA-AD_PoC-V1_0-20060127-C, pp. 1-158.

(Continued)

*Primary Examiner* — Daniel Lastra
(74) *Attorney, Agent, or Firm* — Birch, Stewart, Kolasch & Birch, LLP

(57) ABSTRACT

A group advertisement method in a SIP (Session Initiation Protocol) based message service, and a PT client device are discussed. According to an embodiment, the method includes receiving, by a PT server, a request to send a group advertisement message for a specific PT group from a requesting PT client; determining, by the PT server, if the specific PT group is a restricted chat group or a pre-arranged group; determining, by the PT server, if the requesting PT client is allowed to send a group advertisement based on a PT group document associated with the specific PT group; and selectively transmitting, by the PT server, the group advertisement message to at least one member of the specific PT group based on results of the determining steps.

23 Claims, 3 Drawing Sheets

FOREIGN PATENT DOCUMENTS

WO    2006/027407 A1    3/2006

OTHER PUBLICATIONS

"Push to talk over Cellular (PoC)—Architecture" 3GPP Draft; OMA-AD-PoC-V2_0-20060524-D, 3rd Generation Partnership Project (3GPP), Mobile Competence Centre; 650, Route Des Lucioles; F-06921 Sophia-Antipolis Cedex; France, vol. SA WG2, May 24, 2006, XP050256101, retrieved on Jun. 21, 2006, chapter 6.1.3.1, second point on p. 28 chapter 6.2.11.

"Push to Talk over Cellular 2 Requirements", 3GPP Draft; OMA-RD-PoC-V2_0-20060523-C, 3rd Generation Partnership Project (3GPP), Mobile Competence Centre; 650, Route Des Luvioles; F-06921 Sophia-Antipolis Cedex; France, vol. SA WG2, no. Lisbon:, May 23, 2006, XP050256104, retrieved on Jun. 21, 2006, chapters 6.1.11.2-6.1.11.5, p. 15. "priority levels".

Motorola: "Push to Talk over Cellular (PoC); List Management and Do-not-Disturb", Retrieved from the Internet: http://www.motorola.com/mot/doc/1/1568_MotDoc.pdf>, retrieved on Jun. 2004, pp. 1-57, XP002563034, Chapters 5.3, 5.3.1, 5.3.2 and 7.1.

"PoC XDM Specification," Candidate Version 1.0, Open Mobile Alliance Ltd., Mar. 17, 2005.

"XML Document Management Architecture," Candidate Version 1.0, Open Mobile Alliance Ltd., May 24, 2006.

J. Rosenberg, "The Extensible Markup Language (XML) Configuration Access Protocol (XCAP) draft-ietf-simple-map-11," Cisco Systems, May 5, 2006.

* cited by examiner

FIG.2

```
                                                                    ┌─60
      <?xml version="1.0" encoding="UTF-8"?>
      <group xmlns="urn:oma:xml:poc:list-service"
           xmlns:rl="urn:ietf:params:xml:ns:resource-lists"
           xmlns:cr="urn:ietf:params:xml:ns:common-policy"
           xmlns:ocr="urn:oma:xml:xdm:common-policy"
50──┐    xmlns:ext="urn:oma:xml:xdm:shared-group">
     └──<list-service uri="sip:myconference@example.com">
          <display-name xml:lang="en-us">Friends</display-name>
         ┌<list>
         │   <entry uri="tel:+1-212-555-1234"/>──53a
52──┤   <entry uri="sip:hermione.blossom@example.com"/>── 53b
         └</list>

54──────<max-participant-count>10</max-participant-count>
     ┌──<cr:ruleset>
     │     <cr:rule id="a7c">
     │       ┌<cr:conditions>
     │    56 │   <one id="tel:+1-212-555-1234"/>
     │       │   <one id="sip:hermione.blossom@example.com"/>
     │       └</cr:conditions>                                    ┌59
     │   ┌──<cr:actions>
58──┤   │       <allow-group-advertisement-sending>true</allow-group-advertisement-
     │   └──sending>
     │       </cr:actions>
     │     </cr:rule>
     │   </cr:ruleset>
     │  </list-service>
     │ </group>
```

GROUP ADVERTISEMENT METHOD IN SIP BASED MESSAGE SERVICE

This application claims the priority benefits of U.S. Provisional Application No. 60/809,845 filed on Jun. 1, 2006, Korean Patent Application No. 10-2006-0064641 filed on Jul. 10, 2006 in Republic of Korea, Korean Patent Application No. 10-2006-0066573 filed on Jul. 14, 2006 in Republic of Korea, and Korean Patent Application No. 10-2007-0044692 filed on May 8, 2007 in Republic of Korea. The entire contents of each of these applications are herein incorporated by reference.

BACKGROUND OF THE INVENTION

1. Field of the Invention

The present invention relates to a session based service, and more particularly, a group advertisement method in a SIP (Session Initiation Protocol) based message service.

2. Discussion of the Related Art

In general, a PT (Push-To) service, which is intended to provide rapid communications for service providers and mobile communication users, is a communication service in which one client transmits media data (e.g., talk burst) to one or more other clients with which a session has been established. A PT service can be a PoC (Push-to-talk over Cellular) service for transmission of voice (audio), a PTV (Push To View) service for transmission of pictures (video), or a PTD (Push To Data) service for transmission of data.

The PT service allows communication with a single recipient (1-to-1) or between groups of recipients as in a group chat session (1-to-many), and uses a session initiation protocol (SIP) to establish a session.

In the PT service, one PT client can invite clients or groups, to which clients belong, to a PT session. That is, a particular PT client selects one or more other PT clients to Invite them to the PT session. The session is then established among these PT clients. Accordingly, media data is communicated between the session-established PT clients.

The PT service provides "group advertisement". The group advertisement denotes that one PT group designator designates a particular PT group to inform other PT clients of the existence of the PT group for use. For instance, a particular PT client may advertise (inform) about an address of a PT group (e.g., group name) to the members of the PT group, so that the PT group members can use the PT group address to communicate with each other.

The designated PT group can be divided into an unrestricted chat PT group in which a group advertisement is allowed (accepted) for every PT client, and a restricted chat PT group in which a group advertisement is allowed only for PT group members. The chat PT groups generally are generally established at a server side, e.g., by an operator or an administer, so end-users such as customers can simply join such chat groups. Here, the designator would be the operator or the administrator. Another example of the designated PT group is a pre-arranged PT group which is generally established by an individual end-user. For instance, a user of a terminal can create his own PT group composed of his family and friends as members. Here, the designator is the user who created such pre-arranged PT group.

Therefore, generally the PT group designator registers a PT group document for the corresponding PT group in an XDM (XML Database Management) server. Generally the PT group document identifies the group name/address and the members belonging to the group. A controlling PT server performing a control function can process a group advertisement request of a PT client via a SIP message based on the PT group document.

However, the PT group document according to the related art does not specify any rule or condition regarding the group advertisement, because PT service provides have not made advertising rules for the group advertisement yet. As a result, in the related art, every PT user has been unconditionally allowed to perform a group advertisement with respect to a PT group designated by the PT group designator, which causes frequent invitations to all the group members due to the over-exposure of group and group member addresses. Since any appropriate advertising rule has not be provided for the group advertisement in the related art, the PT group designator can not stably maintain and operate the PT group designated by itself. As a result, a group advertisement in the related art is performed many times and unnecessarily, without the consideration of any relevant factor such as privacy, etc. Also, the related art has a problem in that information related to the corresponding PT group to which participants belong is exposed regardless of their intentions.

SUMMARY OF THE INVENTION

Therefore, an object of the present invention is to provide a group advertisement method of setting, regulating and applying advertising rules for a group advertisement.

Another object of the present invention is to provide a technique of registering a PT group document and a technique of providing a group advertisement based on the PT group document, and any hardware/software needed to implement such techniques, which address the limitations and disadvantages associated with the related art.

Another object of the present invention is to provide a group advertisement method of variously applying subjects or objects of the group advertisement by dynamically creating a rule set of PT group documents.

To achieve those object of the present invention, according to an embodiment there is provide a group advertisement method in a SIP based message service comprising: registering, by a PT group designator, rule information related to a group advertisement for a PT group in an XDM server; and processing a group advertisement request of the PT group designator or a PT user by using documents including the rule information related to the group advertisement registered in the XDM server.

According to one example of the present invention, the rule information related to the group advertisement can be defined in the PT group documents according to subjects or objects of the group advertisement. Preferably, the rule information related to the group advertisement, which is an element indicating whether the PT group is an unrestricted chat PT group or a restricted chat PT group, includes a 'chat-group-type' child element added to a 'list-service' element of the PT group documents.

According to one example of the present invention, when the PT group is the unrestricted chat PT group, the PT server allows (accepts) a group advertisement between certain PT users even if they are not members of the PT group. When the PT group is the restricted chat PT group or a pre-arranged PT group, the PT server allows the group advertisement between PT clients according to the rule information related to the group advertisement designated by the PT group designator.

According to one example of the present invention, the rule information related to the group advertisement includes an element indicating a subject of the group advertisement for the PT group. Preferably, the element regulates whether only the PT group designator can perform the group advertisement, or every PT group member can perform the group advertisement, and includes an 'advertise-all' child element added to the list-service element of the PT group documents.

According to one example of the present invention, another method for regulating the subject rule is to set group advertisement conditions within an actions element. Preferably, when the 'advertise-all' value is false, the PT server allows only the PT group designator who has created the PT group documents to perform the group advertisement. When the 'advertise-all' value is true, the PT server allows every PT group member to perform the group advertisement.

According to one example of the present invention, another method for generating an element indicating a subject of the group advertisement for the PT group is to include a 'group-advertisement-subjects' (also referred to as 'group-advertisement-sending') child element in an actions element of the PT group documents. Preferably, when the 'group-advertisement-subjects' value is false, the PT server does not allow other PT users except for the PT group designator to perform the group advertisement. When the 'group-advertisement-subjects' value is true, the PT server allows any PT user who requests the group advertisement to perform the group advertisement.

According to one example of the present invention, the rule information related to the group advertisement includes an element indicating an object of a group advertisement message for the PT group. Preferably, the element indicates that the group advertisement message is sent only to PT group members or even to certain PT users, and is an 'advertise-members' child element added to the 'list-service' element of the PT group documents. Preferably, when the 'advertise-members' value is false, the PT server allows the group advertisement message to be delivered only to the PT group members. When the 'advertise-members' value is true, the PT server allows a PT user, who wishes to send the group advertisement message, to deliver the group advertisement message to certain PT users.

According to one example of the present invention, another method for generating the element indicating the object of the group advertisement for the PT group is to include a 'group-advertisement-objects' child element in the actions element of the PT group documents. Preferably, when the 'group-advertisement-objects' value is false, the PT server does not allow the group advertisement message to be delivered to the corresponding users. When the 'group-advertisement-objects' value is true, the PT server allows the group advertisement message to be delivered to the corresponding PT users.

According to one aspect, the present invention provides a method of controlling a PT (Push-To) group advertisement, comprising: receiving, by a PT server, a request to send a group advertisement message for a specific PT group from a requesting PT client; determining, by the PT server, if the specific PT group is a restricted chat group or a pre-arranged group; determining, by the PT server, if the requesting PT client is allowed to send a group advertisement based on a PT group document associated with the specific PT group; and selectively transmitting, by the PT server, the received group advertisement message to members of the specific PT group based on results of the determining steps.

According to another aspect, the present invention provides a method for registering a PT (Push-To) group document to be used to control a group advertisement, comprising: receiving, by an XDM server, a PT group document from a designator of a PT group, wherein the PT group document includes group advertisement rule information identifying conditions under which a group advertisement to the PT group can be allowed; performing an authentication of the designator; and storing, by the XDM server, the received PT group document associated with the PT group if the designator is authenticated, whereby a PT server uses the group advertisement rule information in controlling the group advertisement to the PT group.

According to another aspect, the present invention provides a PT (Push-To) terminal comprising: a controller to generate a PT (Push-To) group document of a PT group which is to be used to control a group advertisement to the PT group, and to transmit the generated PT group document in a SIP (Session Initiation Protocol) message to an XDM (XML Database Management) server, wherein the PT group document includes group advertisement rule information identifying conditions under which the group advertisement to at least one member of the PT group can be allowed.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2 illustrates an example of a PT group document according to an embodiment of the present invention.

DETAILED DESCRIPTION OF THE PREFERRED EMBODIMENTS

Now, preferred embodiments of the present invention will be described in detail with reference to the accompanying drawings.

A group advertisement method for a SIP based message service in accordance with embodiments of the present invention may include designating, by a PT group designator, a particular PT group and registering at least one PT group document for the designated PT group in an XDM server; and processing a group advertisement request using the registered PT group document(s) by a PT server which performs a controlling PT function when a particular PT user (i.e. PT client) requests the group advertisement.

In the present invention, a PT client can be a PT terminal such as a mobile phone, a PDA, a smart phone, a computer notebook, etc. or can be an element in such PT terminal. A PT terminal is a terminal capable of providing/receiving a PT service such as a PoC service, a PTV service, a PTD service, etc.

Figure 1:
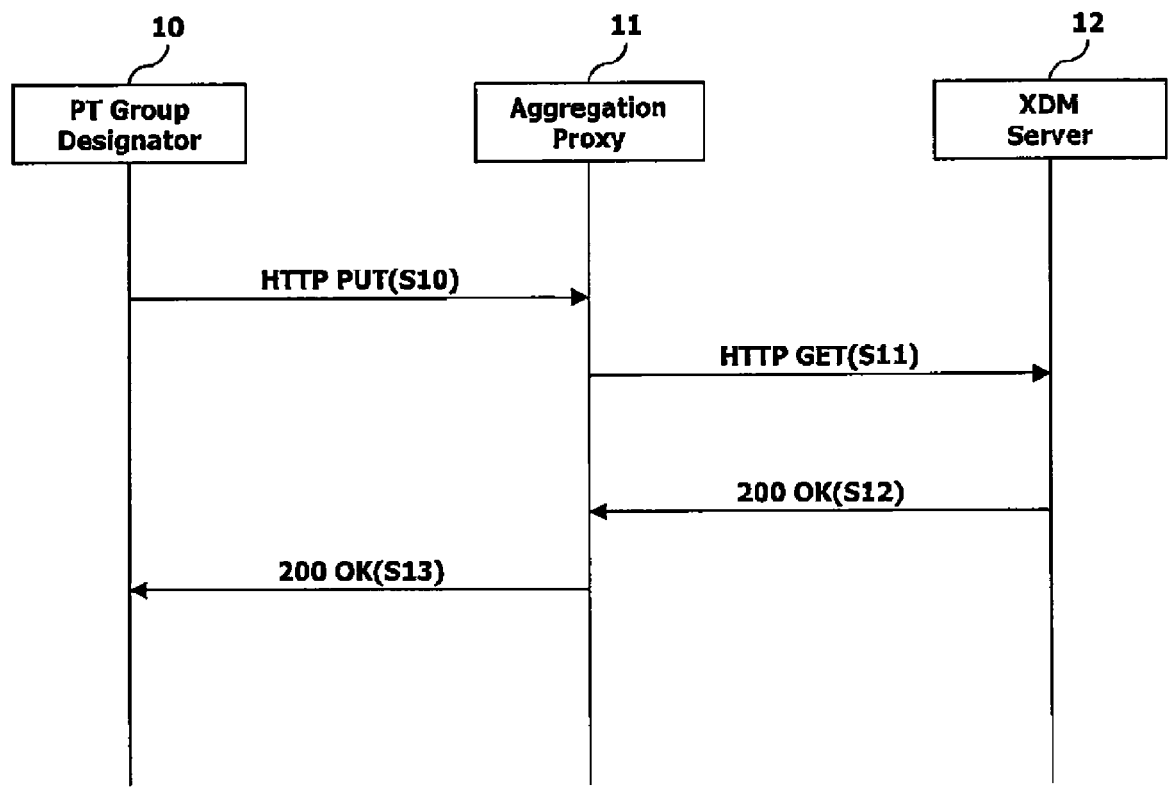
FIG. 1 illustrates a method of registering a PT group document in an XDM server for group advertisement in a SIP-based message service according to an embodiment of the present invention.

FIG. 1 illustrates a method of storing and/or updating a PT group document in an XDM server according to an embodiment of the present invention. Other systems are possible in which the present method can be implemented.

As illustrated in FIG. 1, first, in order to store or update at least one PT group document (e.g., a document 60 in FIG. 2) which describe a PT group, the PT group designator (e.g., a PT client or PT user) 10 sends a HTTP PUT (or HTTP POST) request to an aggregation proxy II using an XCAP protocol (S10) to store or update the PT group document in an XDM server 12. The HTTP PUT (or HTTP POST) request is sent to the XDM server 12 via the aggregation proxy 11 (S11). The XDM server 12 performs an authorization/authentication check required for the PT group designator 10 (e.g., to verify that the current PT group designator 10 is a valid designator, etc.) and then sends a response message (e.g., "200 OK") to the PT group designator 10 through the aggregation proxy 11 (S12 and S13). The response message acknowledges that the PT group document has been stored or updated in the XDM server 12. Thus, the designator of a particular PT group can prepare or generate a PT group document having information concerning the particular PT group, and then store the PT group document in the XDM server 12.

A PT group document is generally an XDM document, and an example of the XDM document stored in the XDM server 12 as shown in FIG. 1 is illustrated in FIG. 2 according to an embodiment of the present invention.

As shown in FIG. 2, an XDM document 60 of the present invention is composed of a <list-service> element 50 under which a <list> element 52, a <ruleset> element 54 and other elements (if desired) are provided. An attribute (content) of the <list-service> element 50 is a group address or other group identification of a PT group to which the XDM document 60 pertains. In the example of FIG. 2, the group address 'myconference@example.com' is provided as an attribute of the <list-service> element 50, which identifies the PT group. At the <list> element 52, a list of members belonging to the PT group identified by the group address 'myconference@example.com' is provided. For instance, the addresses of the members belonging the PT group are provided. In the example of FIG. 2, two members 53a and 53b are identified respectively with "tel=:+1-212-555-1234" and "sip:hermione.blossom@example.com".

The <ruleset> element 54 is composed of a <conditions> element 56 and a <actions> element 58. The <conditions> element 56 identifies a condition (or an object), and the <actions> element 58 identifies an action or function to be performed by the condition (or object) identified in the <conditions> element 56. According to an embodiment, at the <conditions> element 56, one or more PT client(s) (or users) are identified, and at the <actions> element 58, whether or not sending of a group advertisement (e.g., an advertisement message to advertise a particular PT group address) is allowed by the PT client(s) identified in the corresponding <conditions> element 56. Here, as a sub element of the <actions> 58, a <allow-group-advertisement-sending> element 59 is provided which identifies what the action is. Here the action is sending a group advertisement message. If the <allow-group-advertisement-sending> element 59 is "false", then each member identified in the <conditions> element 56 is prevented from sending a group advertisement message. On the other hand, If the <allow-group-advertisement-sending> element 59 is "true", then each member identified in the <conditions> element 56 is allowed to send a group advertisement message to all the members belonging to the PT group (i.e., the members identified at the <list> element 52. In the example of FIG. 2, since the <allow-group-advertisement-sending> element 59 is 'true', this means each of the members (e.g., "tel=:+1-212-555-1234" and "sip: hermione.blossom@example.com") identified in the <conditions> element 56 is allowed to send a group advertisement message to the members 53a and 53b listed in the <list> element 52, if requested.

Figure 3:
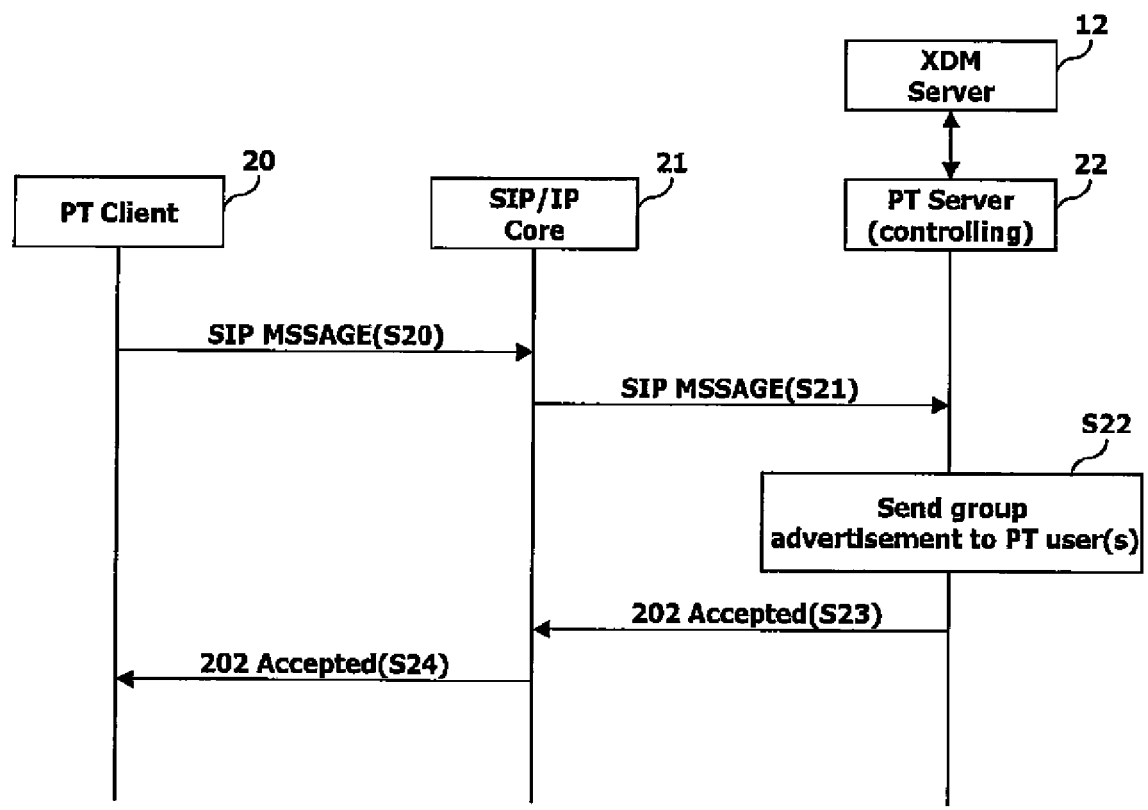
FIG. 3 illustrates a method for processing a group advertisement by a PT server which performs a controlling PT function using a PT group document registered in an XDM server, according to an embodiment of the present invention.

FIG. 3 illustrates a method of selectively processing a group advertisement by a PT server which performs a controlling PT function using a PT group document registered in an XDM server, according to an embodiment of the present invention.

As illustrated in FIG. 3, first, a PT client 20 sends a SIP MESSAGE to a SIP/IP core 21 to request a group advertisement (S20). A group advertisement may involve, e.g., sending an advertisement message to one or more members of a particular group. A SIP MESSAGE is a specific message used to transfer Instant Message (IM) according to known SIP protocols. Here, the SIP MESSAGE includes a PT group address (e.g., 'myconference@example.com'). Here, the SIP/IP core 21 routes such SIP messages, and can correspond to an IMS (IP Multimedia Subsystem) in 3GPP and to an MMD (MultiMedia Domain) in 3GPP2.

The SIP/IP core 21 sends the received SIP MESSAGE to a PT server 22 (S21). The PT server 22 obtains at least one PT group document associated with the PT group address (or group identification) specified in the received SIP MESSAGE from the XDM server 12. As mentioned above, one or more PT group documents regarding a particular PT group can be registered or stored in the XDM server 12 according to the method of FIG. 1.

Once the PT group document is retrieved, the PT server 22 determines whether or not to allow the requesting PT client 20 to send the group advertisement (e.g., a group advertisement message) to other PT client(s) based on the retrieved PT group document. If the XDM server 12 determines that the sending of the group advertisement is permitted, the PT server 22 sends the group advertisement to appropriate PT client(s) based on the obtained PT group document (S22). However, if the obtained PT group document indicates that the requested group advertisement is not allowed, then the PT server 22 does not allow such group advertisement by the PT client 20 and may inform this decision to the PT client 20.

Step S22 according to an embodiment of the present invention is now described in more detail referring to FIG. 2. When the PT server 22 receives the SIP MESSAGE from the PT client 20 (group advertisement requester) through the SIP/IP Core 21 in steps S20 and S21, the PT server 22 obtains a PT group document associated with the group address (or group identification) specified in the received SIP MESSAGE from the XDM server 12. As an example only, if the received SIP MESSAGE includes the group address "myconference@example.com," then the PT server 22 retrieves the PT group document 60 from the XDM server 12. Then the PT server 22 checks if the identified group (e.g., based on the group address) is a restricted chat group or a pre-arranged group. This determination may be based on PT group information stored either in the PT server 22 or in the PT group document stored in the XDM server 12. Here, the group having the group address of "myconference@example.com" is assumed to be a restricted chat PT group or a pre-arranged PT group. The PT server 22 also checks if the requester (PT client 20) is one of the PT client(s) identified at the <conditions> element 56 of the XDM document 60. If the current requester (PT client 20) is identified at the <conditions> element 56 and the group is determined to be a restricted chat group or a pre-arranged group, then the PT server 22 determines whether an action as specified in the <actions> element 58 is to be performed.

For instance, since the XDM document 60 includes

```
...
<actions>
    <allow-group-advertisement-sending>true</allow-group-
    advertisement-sending>
</actions>
...
``` and since the requested PT group is considered to be a restricted chat PT group or a pre-arranged PT group, then the PT server 22 determines that the requester 20 is allowed to send a group advertisement to the members of the group (value of the element 59 is 'true'), and sends the group advertisement (e.g., the received SIP MESSAGE) to the members 53a and 53b of the group as identified under the <list> element 52.

In the embodiments of the present invention, the names of the elements mentioned can be changed as desired. For instance, the parameter <allow-group-advertisement-sending> can also be referred to as a <group-advertisement-subjects> or other name.

After completely sending the group advertisement, the PT server 22 sends a response (e.g., 202 accepted) to the PT client 20 via the SIP/IP core 21 to inform that the group advertisement request has been accepted (S23 and S24).

As such, in the present invention, a PT client/user can pre-set rules about how a group advertisement for a PT group of the PT client/user should be processed by a PT client. Further, the present invention allows the PT server to control a group advertisement from a PT client to one or more other PT clients based on the group advertisement rules set forth in the corresponding PT group document stored in an XDM server. Moreover, by dynamically creating an advertising rule of the PT group document as illustrated in FIG. 2 according to the type of the PT group and the PT group members, and if the group advertisement is requested by a particular PT client, various group advertisement methods can be provided according to the created advertising rule.

Hereinafter, five examples of a group advertisement processing method according to an embodiment of the present invention will be described in detail.

A first example of the present invention illustrates a group advertisement method according to the type of the PT group. This method is performed by adding an element, by which the type of the PT group (e.g., unrestricted chat PT group or restricted chat PT group or pre-arranged PT group) can be recognized, to the PT group document(s).

For instance, in order to perform this method, the PT group designator 10 adds a <chat-group-type> child element under the <list-service> element 50 of the PT group document illustrated in FIG. 2. The <chat-group-type> element can preferably represent whether the chat PT group is the restricted chat PT group or the unrestricted chat PT group. Here, "restricted" or "true" can indicate that the PT group is the restricted chat PT group, while "unrestricted" or "false" can indicate that the PT group is the unrestricted chat PT group. For example, for the unrestricted chat PT group, the <chat-group-type> child element can be represented as follows.

```
...
<list-service uri= "sip:myconference@example.com">
    <display-name xml: lang="en-us">Friends</display-name>
    <chat-group-type>false</chat-group-type>
...
```

In another example, a <group-type> element may be provided under the <list-service> element 50, which indicates the type of the PT group. Other examples are possible. Therefore, when the above PT group document(s) have been registered in the XDM server 12, in case of the unrestricted chat PT group, the PT server 22, which performs the group advertisement using the corresponding PT group document(s), may accept (allow) the group advertisement between certain PT clients (i.e., PT users) even if they are not the PT group members. Alternatively, in case of the restricted chat PT group or in case where the corresponding group is a pre-arranged PT group, the PT server 22 may accept (allow) the group advertisement only between PT clients designated by the PT group designator according to the PT group document(s).

Here, an ID information list of the designated PT clients is predefined in the PT group document(s), as a conditions element, by the PT group designator.

A second example of the present invention is a group advertisement method according to a subject which requests the group advertisement, wherein the present invention regulates whether only the PT group designator can perform the group advertisement or every PT group member can perform the group advertisement.

For instance, in order to perform this method, the PT group designator 10 adds an <advertise-all> child element under the <list-service> element of the PT group document illustrated in FIG. 2. The <advertise-all> element can be set to "false" or "true". Here, "false" can indicate that only the PT group designator 10 is accepted (allowed) to perform the group advertisement, while "true" can indicate that every PT group member identified in the <list> element 52 is accepted to perform the group advertisement. For example, when every PT group member is accepted to perform the advertisement, the <all-advertise> child element is represented as follows.

```
...
<list-service uri= "sip:myconference@example.com">
    <display-name xml: lang="en-us">Friends</display-name>
    <advertise-all>true</all-advertise>
...
```

Therefore, when the above PT group documents have been registered in the XDM server 12, in case where the <advertise-all> element value is "false", the PT server 22, which performs the group advertisement using the corresponding PT group documents, accepts only the PT group designator 10 having composed the PT group documents to perform the group advertisement, while the PT server 22 accepts every PT group member to perform the group advertisement in case where the <advertise-all> element value is "true".

In a third example of the present invention, a group advertisement method according to the subject which requests the group advertisement can be variously set. This method is implemented such that only particular PT users accepted by the PT group designator 10 can perform the group advertisement.

For instance, in order to perform the method, the PT group designator 10 adds a <group-advertisement-subjects> child element under the <actions> element 58 of the PT group document illustrated in FIG. 2. The <group-advertisement-subjects> element preferably can represent whether the group advertisement is accepted only for particular PT group members. Here, "false" as the value of the <group-advertisement-subjects> can indicate that PT users represented in the <conditions> element are not accepted/allowed to advertise to the corresponding PT group members. That is, the PT server restricts the transmission of group advertisement messages by users (or clients) included in an ID information list of the <conditions> element. On the other hand, "true" as the value of the <group-advertisement-subjects> can indicate that the PT users represented in the <conditions> element are accepted/allowed to advertise to the corresponding PT group members. That is, the PT server accepts users included in the ID list of the <conditions> element to send the group advertisement messages.

For example, when the advertisement is accepted/allowed for the particular PT group members, the <group-advertisement-subjects> child element is represented as follows,

```
...
<cr: actions>
    <group-advertisement-subjects>true</group-advertisement-subjects>
```

Therefore, when the above PT group documents have been registered in the XDM server 12, in case where the <group-advertisement-subjects> element value is "false", the PT server 22, which performs the group advertisement using the PT group documents, does not allow the users included in the ID information list to perform the group advertisement, while the PT server allows the users included in the ID information list to perform the group advertisement in case where the <group-advertisement-subjects> element value is "true". A fourth example of the present invention is a group advertisement method according to an object to which a group advertisement is sent. This method is implemented such that the group advertisement message is sent to only PT group members or even to certain PT users.

For instance, in this example, the PT group designator 10 adds an <advertise-members> child element under the <list-service> element 50 of the PT group document illustrated in FIG. 2. The <advertise-members> element can preferably represent whether an advertisement for particular PT addresses has been accepted/allowed. Here, "false" as the value of the <advertise-members> element can indicate that the group advertisement message is allowed to be sent to the PT users represented in the <conditions> element, while "true" as the value of the <advertise-members> element can indicate that the group advertisement message is allowed to be sent even to particular PT users. For example, when the group advertisement message is allowed to be sent only to the PT group members, the <advertise-members> child element is represented as follows.

```
...
<list-service uri= "sip:myconference@example.com">
    <display-name xml: lang="en-us">Friends</display-name>
    <advertise-members>false</ advertise-members >
...
```

Therefore, when the above PT group documents have been registered in the XDM server 12, in case where the <advertise-members> element value is "false", the PT server 22, which performs the group advertisement using the corresponding PT group documents, allows the group advertisement message to be sent only to the PT group members, while the PT server 22 allows a PT user, who desires to send the group advertisement message, to send the group advertisement message to particular PT users.

A fifth example of the present invention illustrates a group advertisement method according to an object to which a group advertisement is sent. This method is implemented such that the group advertisement message is allowed to be sent to PT users accepted by a PT group designator.

For instance, in order to perform this method, the PT group designator 10 adds a <group-advertisement-objects> child element under the <actions> element 58 of the PT group document illustrated in FIG. 2. As an example, the <group-advertisement-objects> element value can be set to "false" or "true". Here, "false" as the value of the <group-advertisement-objects> element can indicate that the group advertisement message is restricted to be sent to PT users included in the <conditions> element (i.e., users designated in the <conditions> element 56), while "true" as the value of the <group-advertisement-objects> element can indicate that the group advertisement message is allowed to be sent to the PT users included in the <conditions> element. For example, when particular PT group members are accepted/allowed to receive the group advertisement message, the <group-advertisement-objects> child element is represented as follows.

```
...
<cr: actions>
    <group-advertisement-objects>true</group-advertisement-objects>
```

Therefore, when the PT group documents have been registered in the XDM server 12, in case where the <group-advertisement-objects> element value is "false", the PT server does not allow the group advertisement message to be sent to the corresponding PT users, while the PT server allows the group advertisement message to be sent to the corresponding PT users in case where the <group-advertisement-objects> element value is "true".

As aforementioned, the present invention allows a PT client/user to dynamically define an advertising rule in a PT group document to enable a group advertisement from various subjects to various objects. Also, if necessary, the group advertisement can be selectively restricted to allow a stable maintenance and operation of a PT group designated by a PT group designator.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method of controlling a PT (Push-To) group advertisement, comprising:
    receiving, by a PT server, a request to send a group advertisement message for a specific PT group from a requesting PT client,
    wherein the group advertisement message informs other PT clients of the existence of the specific PT group;
    determining, by the PT server, if the specific PT group is a restricted chat group or a pre-arranged group;
    determining, by the PT server, if the requesting PT client is allowed to send a group advertisement based on an action element being set as 'true' or 'false'; and
    selectively transmitting, by the PT server, the group advertisement message to at least one member of the specific PT group based on results of the determining steps.

2. The method of claim 1, wherein the action element is contained in a PT group document obtained from an XDM (XML Database Management) server.

3. The method of claim 2, wherein the PT group document comprises a <list-service> element, a <conditions> element, and an <actions> element.

4. The method of claim 3, wherein the PT group document comprises group advertisement parameters including the <conditions> element that specifies whether said requesting PT client is identified in a list of authorized PT clients and the <actions> element that specifies whether a list of actions allows sending of said group advertisement message related to said specific PT group based on whether an <allow-group-advertisement-sending> element under the <actions> element is set as 'true' or 'false'.

5. The method of claim 2, wherein the step of determining if the requesting PT client is allowed to send the group advertisement based on the PT group document includes:
  (a) determining if the requesting PT client is identified under a specific <conditions> element in the PT group document;
  (b) determining if an <actions> element associated with the specific <conditions> element in the PT group document indicates that a specified action is allowed; and
  (c) determining that the requesting PT client is allowed to send the group advertisement to the at least one member of the specific PT group based on results of the steps (a) and (b).

6. The method of claim 5, wherein the <actions> element includes a parameter <allow-group-advertisement-sending>.

7. The method of claim 6, wherein if a value of the parameter <allow-group-advertisement-sending> is 'false', then the step (b) determines that the specified action of sending the group advertisement is prevented.

8. The method of claim 6, wherein if a value of the parameter <allow-group-advertisement-sending> is 'true, then the step (b) determines that the specified action of sending the group advertisement is allowed.

9. The method of claim 5, wherein the step (c) determines that the requesting PT client is allowed to send the group advertisement to the at least one member of the specific PT group, if the step (a) determines that the requesting PT client is identified under the specific <conditions> element and if the step (b) determines that the <actions> element indicates the specified action is allowed.

10. The method of claim 5, wherein the step (c) determines that the requesting PT client is not allowed to send the group advertisement to the at least one member of the specific PT group, if the step (a) determines that the requesting PT client is not identified under the specific <conditions> element or if the step (b) determines that the <actions> element indicates the specified action is not allowed.

11. The method of claim 1, wherein the group advertisement message is a SIP (Session Initiation Protocol) MESSAGE.

12. A method for registering a PT (Push-To) group document to be used to control a group advertisement, comprising:
  receiving, by an XDM (XML Database Management) server, group advertisement parameters for determining if a PT client is allowed to send a group advertisement message to a specific PT group, wherein the group advertisement message informs other PT clients of the existence of said specific PT group;
  performing an authentication of a designator;
  storing, by the XDM server, the received group advertisement parameters associated with the PT group if the designator is authenticated; and
  providing the group advertisement parameters to a PT server for controlling the sending of group advertisement messages to the PT group such that the PT server
    receives a request to send a group advertisement message for a specific PT group from a requesting PT client;
    determines if the specific PT group is a restricted chat group or a prearranged group;
    determines if the requesting PT client is allowed to send a group advertisement message to said specific PT group, based on an action element being set as 'true' or ' false'; and
    transmits the group advertisement message to at least one member of the specific PT group based on results of the two determining steps.

13. The method of claim 12, wherein receiving the group advertisement parameters comprises receiving a PT group document comprising said group advertisement parameters associated with said specific PT group,
  wherein the action element is contained in the PT group document, and
  wherein the PT group document is received in a SIP (Session Initiation Protocol) message.

14. The method of claim 13, wherein the SIP message is a HTTP PUT or a HTTP POST.

15. The method of claim 13, wherein the PT group document comprises a <list-service> element, a <conditions> element, and an <actions> element, and wherein the PT group document comprises group advertisement parameters including the <conditions> element that specifies whether said requesting PT client is identified in a list of authorized PT clients.

16. The method of claim 15, wherein the <actions> element specifies whether a list of actions allows sending of said group advertisement message related to said specific PT group based on whether an <allow-group-advertisement-sending> element under the <actions> element is set as 'true' or 'false'.

17. A PT (Push-To) terminal comprising:
  a controller adapted to generate PT group advertisement parameters associated with a specific PT group and to transmit the group advertisement parameters to an XDM (XML Database Management) server,
  wherein the group advertisement parameters indicate if a PT client is allowed to send a group advertisement message to said specific PT group, wherein the group advertisement message informs other PT clients of the existence of the specific PT group, and
  wherein said controller is further adapted to send a request to a PT server to send the group advertisement message for a specific PT group such that the PT server determines if the specific PT group is a restricted chat group or a prearranged group, and determines if the requesting PT client is allowed to send a group advertisement message to said specific PT group, based on an action element being set as 'true' or 'false'.

18. The PT terminal of claim 17, wherein the PT terminal is a designator of the PT group.

19. The PT terminal of claim 17, wherein the controller is adapted to transmit said group advertisement parameters in a SIP (session Initiation Protocol) message and wherein the SIP message is a HTTP PUT or a HTTP POST.

20. The PT terminal of claim 17, wherein the action element is contained in a PT group document, and the PT group document comprises a <list-service> element, a <conditions> element, and an <actions> element, and wherein the PT group document comprises group advertisement parameters including the <conditions> element that specifies whether said requesting PT client is identified in a list of authorized PT clients and the <actions> element that specifies whether a list of actions allows sending of said group advertisement message related to said specific PT group based on whether an <allow-group-advertisement-sending> element under the <actions> element is set as 'true' or 'false'.

21. The PT terminal of claim 17, wherein the controller is adapted to generate a PT group document comprising said group advertisement parameters associated with said specific PT group.

22. The PT terminal of claim 17, wherein the controller is further adapted to send, to the PT server, a request to send a group advertisement message to said specific PT group, said message comprising information parameters used by the PT server to determine a type of session between the PT terminal and the PT server and used by the PT server to be compared with the group advertisement parameters to determine if the PT terminal is allowed to send a group advertisement message to said specific PT group.

23. The PT terminal of claim 17, wherein the PT terminal is a mobile phone.

* * * * *